(No Model.)

J. N. FORDHAM.
ASH SIFTER.

No. 569,041. Patented Oct. 6, 1896.

WITNESSES:

INVENTOR
J. N. Fordham.
BY
ATTORNEYS.

UNITED STATES PATENT OFFICE.

JOHN N. FORDHAM, OF BROOKLYN, NEW YORK.

ASH-SIFTER.

SPECIFICATION forming part of Letters Patent No. 569,041, dated October 6, 1896.

Application filed February 26, 1896. Serial No. 580,800. (No model.)

*To all whom it may concern:*

Be it known that I, JOHN N. FORDHAM, of Brooklyn, in the county of Kings and State of New York, have invented a new and Improved Ash-Sifter, of which the following is a full, clear, and exact description.

The object of the invention is to provide a new and improved ash-sifter which is simple and durable in construction, easily manipulated, arranged to permit the operator to conveniently charge the sifter with the material to be treated, and to effectively separate the cinders from the fine ashes without raising any dust.

The invention consists principally of a casing having an inclined hopper, an outlet-chute for the cinders, and an inclined circular grate upon which opens the hopper and which discharges into said chute.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
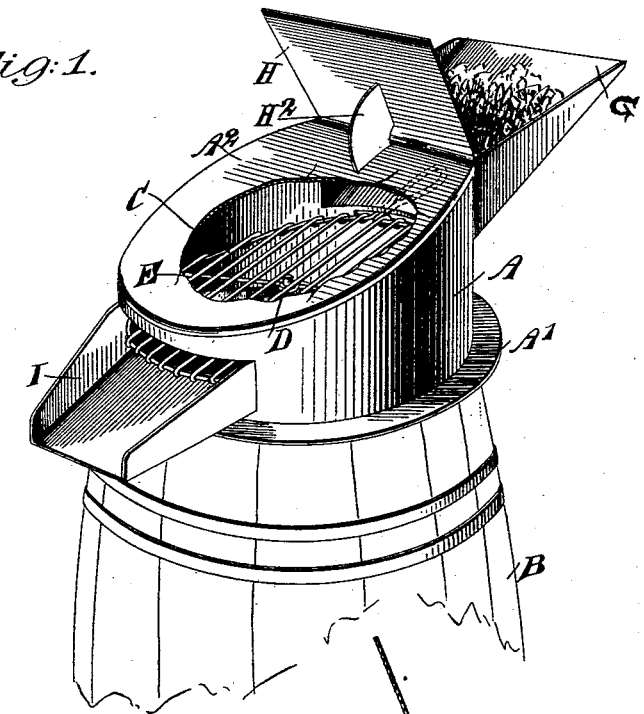
Figure 2:
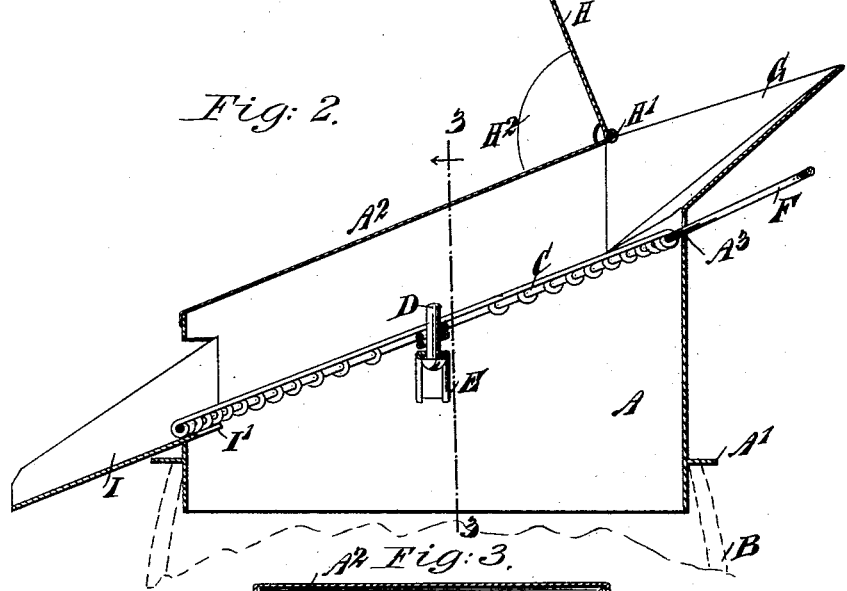
Figure 3:
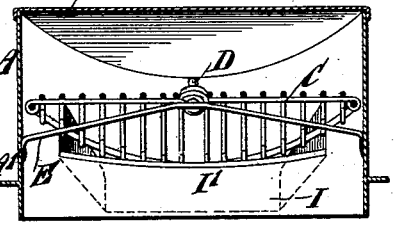

Figure 1 is a perspective view of the improvement. Fig. 2 is an enlarged sectional side elevation of the same, and Fig. 3 is a transverse section of the same on the line 3 3 of Fig. 2.

The improved ash-sifter is provided with a circular casing A, formed near its lower open end with an outwardly-extending annular flange A', arranged above its lower edge and adapted to rest on the top of an ash can or barrel wherein the lower end of the casing is inserted to support the sifter in place on said can or barrel. The casing A is provided with a close top $A^2$, and within said casing is arranged an inclined circular grate C, mounted to turn on a pin D, secured on and projecting upwardly from a cross-bar E, attached to the sides of the casing A. (See Figs. 2 and 3.)

The grate C is provided with parallel grate-bars extending from the top to the bottom and secured at their ends in a wire ring, braced transversely by a rod formed at the middle with an eye for the reception of the pivot-pin D. The upper end of the grate C is provided with a handle F, which extends through a slot $A^3$ in the casing A to the outside thereof to be within reach of the operator to permit him to turn the grate on its pivot-pin D.

As shown in Figs. 1 and 2, the handle F is formed by an outward bend of the wire of which the ring of the grate is formed.

From the side of the casing A and near the upper end thereof extends a hopper G, adapted to receive the material to be treated, said hopper discharging directly upon the upper part of the grate C, as will be readily understood by reference to Figs. 1 and 2. The hopper G is adapted to be closed by a cover or lid H, hinged at H' to the top $A^2$, and said cover is provided with a supporting-flange $H^2$, adapted to rest on the top $A^2$ to support said cover in an open position, as plainly shown in Figs. 1 and 2, said cover then forming an extended back for the hopper G.

Now it will be seen that when the material is shoveled into the hopper G the cover H prevents the material from being scattered about and at the same time directs the material downward into the hopper and to the upper end of the grate C. When the hopper G has been charged with material, the cover H is closed to prevent dust from escaping from the casing at this end. An outlet or discharge chute I extends from the side of the hopper A at the lower end thereof, and this chute I has its bottom parallel with the grate C, the lower end of which extends over a flange I', forming part of the bottom of the chute and projecting inwardly within the casing A.

Now it will be seen that when the casing is placed on an ash can or barrel and the hopper is charged with the material to be treated and the cover or lid H is closed the ashes can be readily sifted by the operator moving the handle F to impart a turning motion to the grate C. It is evident that the fine ashes readily pass between the parallel grate-bars down through the casing into the can or barrel, and the cinders readily travel down between the grate-bars into the chute I, which delivers said cinders into a pail or other receptacle set on the outside of the barrel or can B.

As shown in the drawings, the bars of the grate C are formed of parallel wire rods having loops at their ends to embrace the wire ring which forms the frame of the grate. By this construction it will be seen that the parallel grate-bars form between them gutters or channels adapted to guide the cinders from the upper to the lower portion of the grate, so that said cinders will readily travel from the hopper G to the discharge-chute I.

Having thus fully described my invention, I claim as new and desire to secure by Letters Patent—

1. An ash-sifter, having a grate formed of a wire ring, a series of wire rods having their ends formed with loops to engage said ring, said rods extending parallel across the ring, and a transverse brace extending across the series of rods and having at its central portion an eye to receive the pivot-pin, substantially as set forth.

2. The combination, in an ash-sifter, with the casing having an open bottom adapted to rest on an ash-can or the like, said casing having a hopper extending from the side and near the upper end thereof and provided with a diametrically-opposed chute; of an inclined grate pivoted centrally of said casing, said grate consisting of a wire ring, a series of parallel rods secured only at their ends to said ring, and a transverse brace extending across said ring at right angles to said rods, said brace having at its central portion an eye to receive a pivot-pin, as and for the purpose set forth.

3. In an ash-sifter, the combination with the casing having an open bottom adapted to rest on an ash-can or the like and provided with a hopper and a diametrically-opposed chute; of a cross-bar attached to the sides of said casing having a pin projecting upwardly from its center, an inclined grate formed of a wire ring and a series of parallel bars secured only at their ends to said ring, a transverse brace extending across said ring at right angles to said rods and having at its central portion an eye to receive said pin, and an operating-handle formed integral with said ring and extended through a slot in said casing to the outside thereof, as and for the purpose set forth.

JOHN N. FORDHAM.

Witnesses:
JOHN J. GRACE,
JOHN HERRMANN.